United States Patent Office 2,951,620
Patented Sept. 6, 1960

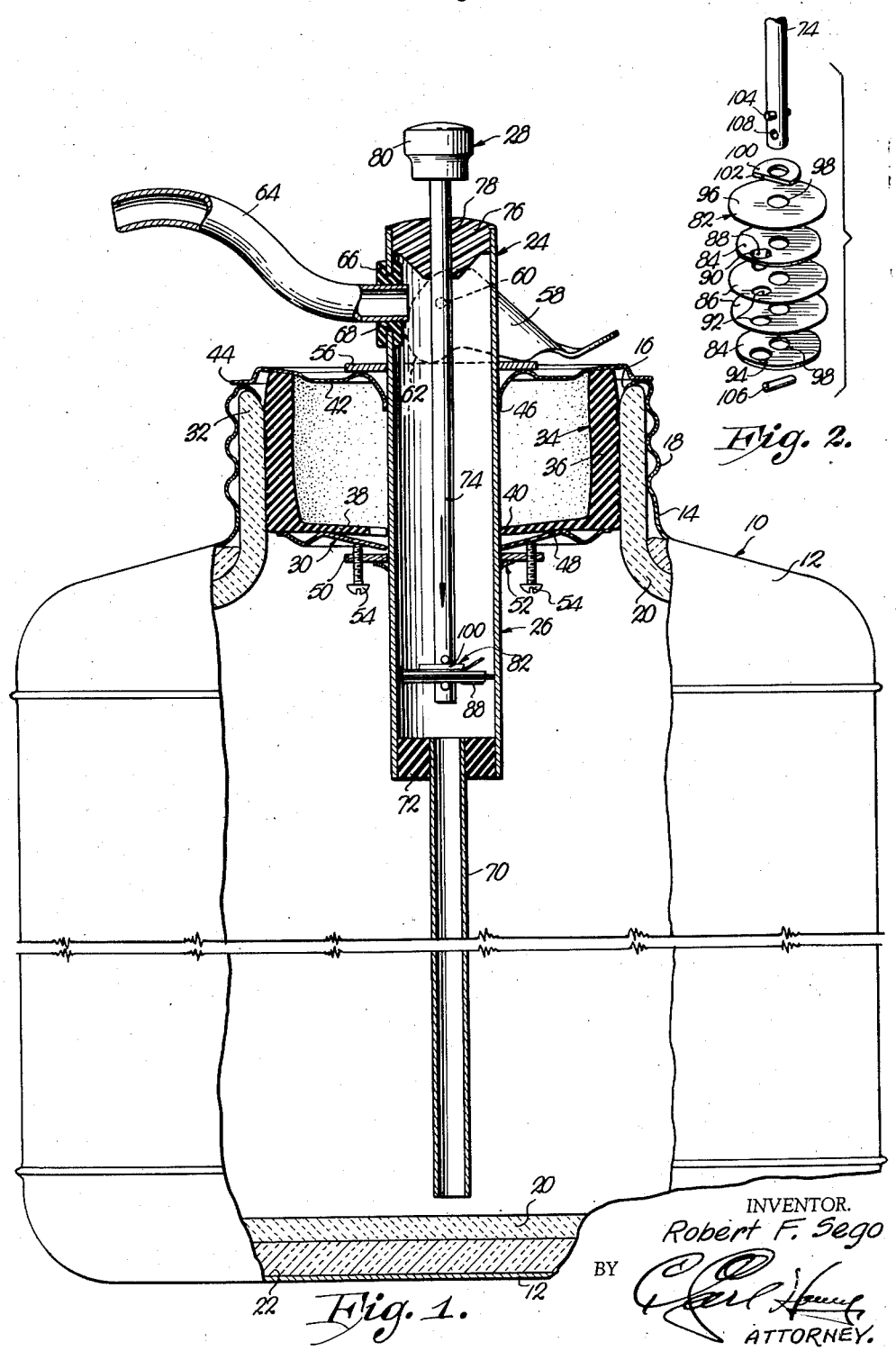

2,951,620

PUMP FOR INSULATED JUG

Robert F. Sego, 3148 Hardesty Drive, Kansas City, Mo.

Filed Aug. 7, 1958, Ser. No. 753,690

3 Claims. (Cl. 222—385)

This invention relates to thermally insulated, liquid beverage containers and more specifically to an insulated jug of conventional character having novel pump means incorporated therewith to permit liquid in the jug to be dispensed as desired from the top of such jug without lifting or tilting of the latter being necessary.

Thermally insulated jugs have become increasingly popular in recent years as containers for transporting all types of liquid beverages, whether hot or cold, and are especially adapted for utilization by sportsmen on hunting and fishing trips, as well as persons desiring to carry a supply of a liquid beverage in the trunk of their cars or the like. However, the insulated jugs previously provided necessitated emptying of the same by either picking the jug up from the supporting surface and tilting the same so that the liquid could be poured from the open top of the jug or, in the alternative, disposing such container on a surface in a manner so that the liquid could be drained from the jug through a suitable valve controlled spigot at the bottom of the jug and communicating with the interior thereof. In many instances, these operations were inconvenient or even impossible and this was particularly true when such jugs were disposed on the bottom of a boat or on the floor panel of the person's automobile trunk.

It is, therefore, the most important object of the present invention to provide an insulated jug having a pump removably positioned within the open top of the container and adapted for delivering liquid in the jug from the upper end thereof and without requiring that the latter be lifted from the supporting surface, tilted on its side, or placed in a location where the liquid can be drained from a spigot at the bottom of the jug.

It is a further important object of the invention to provide a pump for insulated jugs operating on a non-pressurized, lift principle to thereby assure efficient delivery of liquid from the upper end of the jug without leakage of such liquid from the jug either during the pumping operation or subsequent thereto by virtue of pressures which would be built up inside the jug if a pressurized type pump were employed.

Also an important object of the invention is to provide a lift type of pump for insulated jugs having improved lift piston structure within the main delivery tube of the pump assuring rapid and efficient delivery of the liquid from the jug, with the components of the lift structure being designed to resist the action of the ingredients contained in the liquid pumped from the jug and which may be hot, cold, acid in character, or contain a quantity of sugar, which would otherwise deleteriously affect the various parts.

A further important object of the invention is to provide an improved pump assembly for insulated jugs constructed of relatively inexpensive, readily available or easily manufactured parts which may be assembled in a minimum of time, thereby materially reducing the price at which the jug having the pump thereon may be sold.

Other important objects of the invention relate to the provision of a pump for jugs having novel lift structure in the main delivery tube thereof including inexpensive, dependable valve construction for assuring lifting of the liquid to the outlet spout during reciprocation of the actuating rod of the pump unit, regardless of the character of the liquid contained in the jug and without sticking or clogging of the various movable parts; to a jug wherein novel sealing means is utilized in conjunction with the lift piston reciprocably mounted in the main delivery tube of the pump and which sealing means is adapted for providing the necessary, substantially liquid-tight seal between the piston and the side wall of the delivery tube during reciprocation of the actuating rod connected to the piston under all operating conditions, whether the liquid be hot or cold and irrespective of the nature of such beverage; to a pump unit as described wherein the sealing means as well as the valve controlling flow of fluid through the piston is constructed of a material capable of resisting acids, sugar and other substances which may be contained in the liquid delivered from the jug and which material is preferably polytetrafluoroethylene, inasmuch as the latter has the desired characteristics; and to other important objects and details of construction of the present invention which will become obvious or be explained more fully as the following specification progresses.

In the drawing:

Figure 1 is a side elevational view of a thermally insulated jug provided with a pump unit embodying the concepts of the instant invention and removably positioned in the open top of the jug with certain parts being broken away and in section to reveal details of construction; and Fig. 2 is a fragmentary, exploded, perspective view of the improved piston and valve structure forming a part of the instant pump unit.

Briefly, the present invention comprises a thermally insulated container in the nature of a jug having novel pump means removably positioned in the open upper end thereof for delivering liquids normally contained in the jug from the upper end thereof. The pump operates on the non-pressurized, lift type principle and has improved piston and valve structure reciprocably disposed within a main delivery tube for directing liquid from the jug through an outlet spout at the top of the tube as the actuating rod of the pump is reciprocated.

A hollow container adapted to receive liquid beverages is broadly designated by the numeral 10 in the drawing and includes an outer casing 12 of metal or the like, provided with an integral, upwardly extending neck 14 defining an upper outlet opening 16. Casing 12 may be conventional in character in that neck 14 is substantially corrugated to present spiral threads 18 adapted to receive a screw cap (not shown) or similar covering means. An imperforate, liquid impervious liner 20 of plastic or ceramic material within casing 12 is separated from the latter by a layer of insulation 22.

Mechanism for pumping liquid from within jug 10 through the opening 16 is generally designated 24 and includes as basic components, an elongated, cylindrical tube 26, non-pressurized lift structure 28 reciprocably carried by tube 26, and mounting components 30 removably securing tube 26 within upwardly projecting neck portion 32 of liner 20.

Mounting components 30 include a ring member 34 of flexible material such as rubber and having a cylindrical collar portion 36 provided with an integral, annular, bottom portion 38 at the lowermost peripheral margin thereof. The inner circular edge 40 of bottom portion 38 frictionally engages the outer cylindrical surface of tube 26, while an annular, transversely irregular plate 42 overlies the upper circular margin of ring member 34. As clearly shown in Fig. 1, the outer peripheral edge 44 of plate 42 engages the upper end 16 of neck 14 to thereby prevent mounting components 30 from passing into liner 20 of jug 10. It is also preferred that the inner circular edge 46 of plate 42 engage the cylindrical surface of tube 26 in spaced relationship to bottom portion 38 of ring member 34. A second circular, transversely irregular plate 48 underlies bottom portion 38 of ring member 34, and an annular washer 50 is positioned over tube 26 in underlying relationship to plate 48. Retaining ring 52 adjustably mounted on tube 26 beneath washer 50 restricts movement of the latter in a downward direction, while a number of adjusting screws 54 threaded through washer 50 in circumferentially spaced relationship and having the upper ends thereof in engagement with plate 48, permit the relative distance between plates 48 and 42 to be adjusted as screws 54 are shifted in washer 50.

Another washer 56 surrounding tube 26 in overlying relationship to plate 42 is shifted longitudinally of tube 26 by a pair of cam members 58 rotatably carried by the upper end of tube 26, one only of such cam members being illustrated in the drawing. Cam members 58, disposed on opposite sides of tube 26, are pivotally connected to the latter by pivot means 60, with arcuate cam surfaces 62 disposed to engage the upper face of washer 56 to reciprocate the latter on tube 26 as cam members 58 are swung about pivot means 60.

Means for delivering liquid from the upper end of tube 26 includes an elongated, arcuate, tubular spout 64 having the inner end thereof frictionally disposed within a grommet 66 of rubber material and in turn positioned within a circular orifice 68 in tube 26 adjacent the upper end thereof. The outer end of spout 64 away from tube 26 is disposed to permit a receptacle to be readily placed under such spout for receiving the liquid delivered from pump mechanism 24.

An elongated, tubular element 70 depending from tube 26 in coaxial alignment therewith and mounted on the same by a rubber washer 72 extends downwardly into liner 20 to a point adjacent the bottom thereof. It is to be pointed out that element 70 is preferably constructed of a material such as "Marlex," a high density polyethylene composition which is flexible in nature and manufactured and distributed by the Phillips Chemical Co. By utilizing material of this nature, pump mechanism 24 is adapted to be utilized in jugs 10 of various sizes because of the fact that the element 70 may bend if necessary, to permit mounting components 30 to be properly positioned within the neck 14 of jug 10, even though the lower end of tubular element 70 engages the bottom of the jug.

Liquid lift structure 28 comprises an elongated actuating rod 74 maintained in concentric relationship to tube 26 by a guide 76 of plastic material such as "Bakelite," manufactured and sold by the Bakelite Corp., guide 76 being frictionally disposed within the uppermost end of tube 26 and provided with a vertical bore 78 reciprocably receiving actuating rod 74. The upper end of rod 74 extends through guide 76, and a knob 80 for facilitating shifting movement of rod 74 is threaded onto the upper end of the same.

Improved piston and valve means 82 secured to rod 74 adjacent the lower end thereof causes liquid to be directed from jug 10 through spout 64 as rod 74 is reciprocated. As best shown in Fig. 2, piston and valve means 82 comprises a pair of circular members 84 of metal or the like and of slightly less diameter than the internal diameter of tube 26. A pair of circular discs 86 disposed between members 84 and constructed of relatively thin sheets of a plastic material such as polytetrafluoroethylene known commercially as "Teflon," are of slightly greater diameter than the internal diameter of tube 26 to provide sealing means engaging the inner surface of tube 26. A circular portion of the normally uppermost member 84 is struck downwardly to present a depending tab 88 and leaving an opening 90 in upper member 84 which is aligned with openings 92 in discs 86 and opening 94 in lower member 84. In an assembled condition, members 84 are positioned in proximal relationship firmly maintaining discs 86 in interengagement, and tab 88 is passed through respective openings 92 and 94 and then pressed rearwardly into firm engagement with the normally lowermost face of lower member 84. An annular valve 96 also formed of a relatively thin sheet of polytetrafluoroethylene is disposed in overlying relationship to upper member 84 and members 84, discs 86 and valve 96 are all provided with central openings 98 receiving the lower end of actuating rod 74. A relatively small washer 100 overlying valve 96 and having a cut away portion 102 clearing openings 90, 92 and 94 in members 84 and discs 86 respectively, is maintained in firm engagement with valve 96 by a cross pin 104 passing through rod 74, while another cross pin 106 extending through transverse bore 108 in rod 74 normally engages the lowermost face of lower member 84 and serves to maintain the components of piston and valve means 82 in correct firm engagement.

In operation, a person may readily pump liquid beverages or the like from within jug 10 through the upper open end thereof defined by neck 14, by merely grasping knob 80 and reciprocating rod 74 with respect to tube 26, to thereby move piston and valve means 82 therewith. Assuming that piston and valve means 82 is initially at the lowermost end of its path of travel, upward movement of rod 74 causes piston and valve means 82 to produce a vacuum within the lower end of tube 26 whereby liquid is drawn upwardly through element 70 into tube 26 until rod 74 reaches the uppermost end of its path of travel. It can be recognized that during upward movement of piston and valve means 82, the portion of valve 96 normally overlying opening 90 in upper member 84 closes such opening and prevents air from passing into the lower end of tube 26. By the same token, the outer peripheral margins of discs 86 slidably engage the inner cylindrical surface of tube 26 and provide a tight seal.

Upon downward movement of rod 74, the portion of valve 96 overlying opening 88 in member 84 moves upwardly as illustrated in Fig. 1, to thereby permit liquid contained in the lower end of tube 26 to pass upwardly through openings 94, 92 and 90 in respective members 84 and discs 86 whereby such liquid is delivered to a suitable receptacle through spout 64 at the uppermost end of tube 26.

Delivery of the liquid beverage from jug 10 may continue so long as liquid remains in liner 20, and relatively fast pumping action is obtained without leakage during delivery of the liquid or after cessation of operation of actuating rod 74, by virtue of the fact that the pumping procedure is not pressurized in any way and utilizes the lift pump principle.

Also it is to be noted that pump mechanism 24 is adapted to be utilized in jugs 10 having necks 14 of various sizes, inasmuch as mounting components 30 may be adjusted to fit openings of various diameters. Compensation for most commonly available jugs 10 is provided by virtue of the cam members 58 engaging washer 56 to reciprocate plate 42 toward plate 48 to thereby expand collar portion 36 of ring member 34, the outermost surface of collar portion 36 frictionally engaging the inner cylindrical surface of liner 20.

More permanent adjustment of the outer diameter of ring member 34 may be provided by moving plate 48 in closer proximity to plate 42 as screws 54 are shifted in washer 50 to force plate 48 toward plate 42. Furthermore, retaining ring 52 may be shifted on tube 26 if even greater compression of ring member 34 is necessary.

A very important feature of the present invention is the utilization of polytetrafluoroethylene as the material from which discs 86 and valve 96 are formed, inasmuch as it has been found that this synthetic resin material is highly resistant to deleterious action by acids or sugar contained within the liquid beverage in jug 10, and efficient pumping action is maintained over a long period of time without breakdown, clogging or sticking of the components presenting pump mechanism 24. Inasmuch as all of the components are readily available on the open market or may be fabricated at a small cost, it is to be emphasized that the instant pump unit may be sold in conjunction with jugs 10 without materially increasing the price of the latter.

Having thus described the invention what is claimed as new and desired to be secured by Letters Patent is:

1. For use with an insulated, hollow jug provided with an opening in the upper end thereof, mechanism for pumping liquid from the jug through said opening comprising: a cylindrical tube; structure adapted for removably mounting the tube in an upright position within said opening in the jug and disposed with the upper end thereof projecting above the jug; an outlet spout connected to said upper end of the tube normally extending above the jug; tubular means coupled with the lower end of the tube depending therefrom and adapted for intercommunicating the tube with the lower internal portion of the jug; movable piston means disposed transversely in the tube and including a pair of circular inflexible members of less diameter than the tube and at least one circular, flexible, tube-engaging sealing disc means of slightly greater diameter than said tube and positioned between said members, said disc means and the members being provided with aligned perforations therethrough presenting a valve opening; an actuating rod coaxial with the tube secured to said piston means and extending through the upper end of the tube; and a circular flexible valve carried by the upper member in overlying, at least partial covering relationship thereto, the portion of the valve normally overlying said aligned perforations closing the latter as the rod and thereby said piston means is shifted in a direction to move the latter from the lower part of the tube to the upper end of the path of travel thereof adjacent said spout, said portion of the valve moving to an open position permitting liquid to pass through said valve opening when the rod and thereby said piston are moved in the opposite direction.

2. Mechanism as set forth in claim 1 wherein said piston means includes at least a pair of said flexible disc means and one of the members has an integral tab extending through said perforations in the disc means and the other member and engaging the latter for maintaining said members in firm interengagement with said sealing disc means.

3. Mechanism as set forth in claim 1, wherein said sealing disc means and the valve are formed from relatively thin, flexible sheets of polytetrafluoroethylene.

References Cited in the file of this patent

UNITED STATES PATENTS

| | | |
|---|---|---|
| 740,221 | Blackmon | Sept. 29, 1903 |
| 1,553,805 | Eckert | Sept. 15, 1925 |
| 1,632,933 | Thornton | June 21, 1927 |
| 1,666,064 | Ament | Apr. 17, 1928 |
| 1,801,066 | Bastian | Apr. 14, 1931 |
| 2,521,433 | White | Sept. 5, 1950 |

FOREIGN PATENTS

| | | |
|---|---|---|
| 185,322 | Australia | May 15, 1955 |